United States Patent Office 3,320,407
Patented May 16, 1967

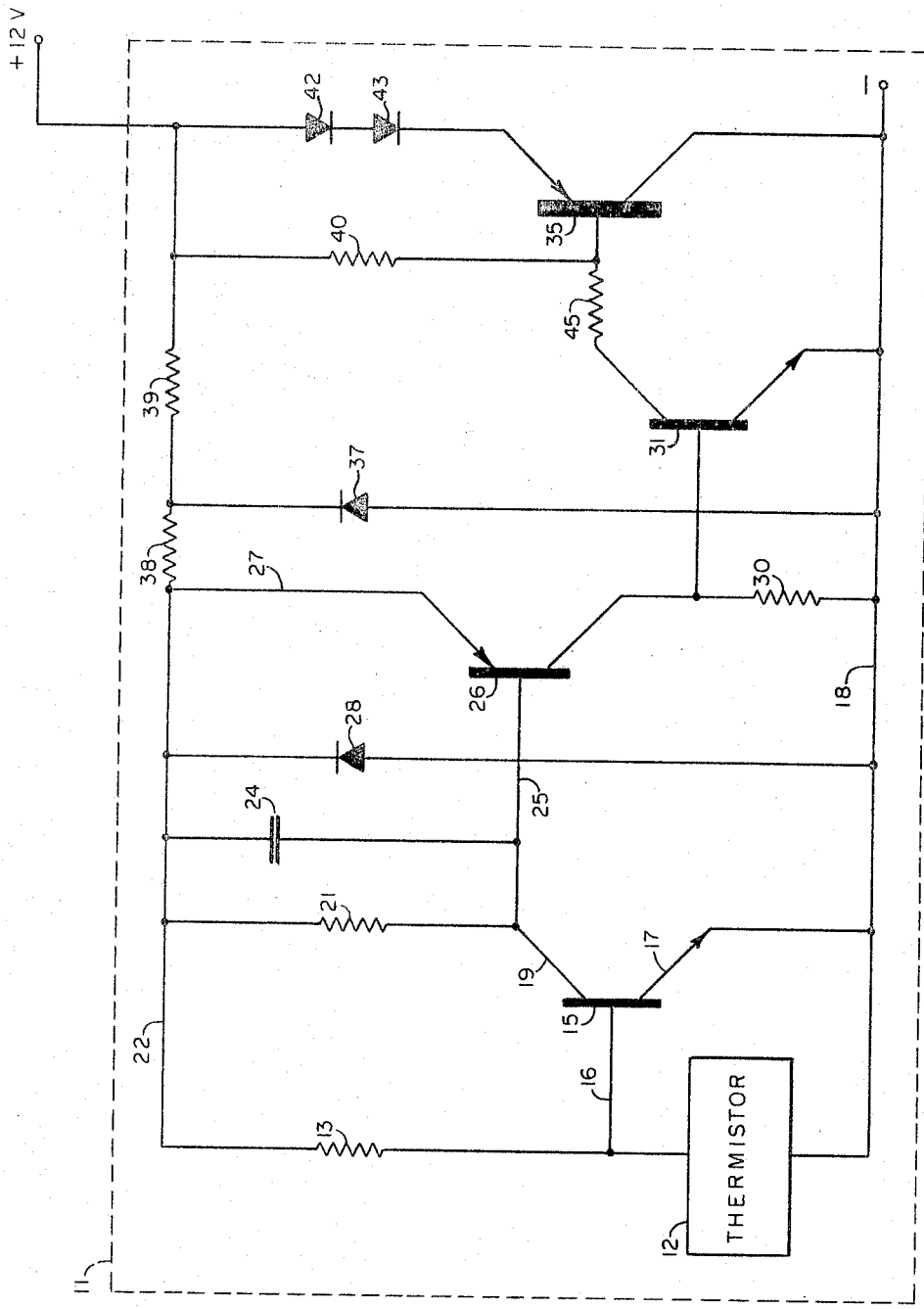

3,320,407
SOLID STATE TEMPERATURE CONTROL
Julian C. Holmes, Washington, D.C., assignor to the United States of America as represented by the Secretary of the Navy
Filed Mar. 27, 1961, Ser. No. 98,721
2 Claims. (Cl. 219—501)

The invention described herein may be manufactured and used by or for the Government of the United States of America for governmental purposes without the payment of any royalties thereon or therefor.

This invention relates generally to temperature control and more particularly to proportional temperature control in contrast to on-off temperature control.

In the past, temperature control has been accomplished in the majority of cases by use of bimetallic strip heat centers having contacts which periodically interrupt the heating to attempt to maintain a fixed temperature. Control through this type of device results in temperature oscillation because the bimetallic strip must have hysteresis in order to open and close. Prior temperature control devices with on-off connections or on-off control also develop excessive noise from sparking contacts, cause an unsteady current drain from the power source, and use physically fragile components which of necessity wear and require periodic adjustment or repair. The present invention provides temperature control through a heater whose heat output can be controlled over wide limits, which adjusts itself to maintain the constant temperature desired, and which provides gradual or proportional replacement of heat rather than on-off control; the result is an unusually fine degree of temperature control as will be more appreciated on review of the following description.

Accordingly it is an object of the present invention to provide a temperature control device which provides proportional control of temperature in lieu of on-off control.

It is another object of the invention to provide proportional control without excessive noise or unsteady current drain from the power source.

It is a further object of the present invention to provide temperature control without a resulting oscillating temperature.

It is still a further object of the present invention to provide temperature control without oscillation of temperature and through the use of components which are made from solid state techniques.

It is a further object of the present invention to provide control of temperature in any device without the use of on-off controls which produce undesirable current surges in the heating element.

Various other objects and advantages will appear from the following description of an embodiment of the invention, and the novel features will be particularly pointed out hereinafter in connection with the appended claims.

In the embodiment of the invention illustrated in the drawing, enclosure 11 encloses the heating unit of the invention and is to be placed inside the oven or compartment whose temperature is to be controlled. Within enclosure 11 the components of the device, connected in the manner shown, include thermistor 12 or any similar temperature sensing device, and a silicon transistor against whose conduction threshold the voltage across the thermistor is compared. The operation is such that current from a regulated 4-volt source, Zener diodes 28 and 37 and resistors 38 and 39, flows through the series combination of resistance 13 and thermistor 12. The thermistor 12 chosen is one which will at a preselected temperature permit sufficient voltage to be applied across the base and emitter electrodes of transistor 15 so as to cause that transistor to conduct current. In the particular embodiment shown, the transistor 15 is a silicon transistor which conducts at approximately ½ volt. In this instance thermistor 12 may be selected to have a resistance of 100 ohms at 50° C., resistance 13 then will have a resistance of 700 ohms such that the voltage drop across resistance 13 will be ⅞ of the voltage across both resistance 13 and thermistor 12 and the voltage drop across thermistor 12 will be ⅛ or ½ volt at 50° C. It will be appreciated that were another temperature desired the thermistor selected as well as resistance 13 selected would necessarily have values which would put the desired ½ volt across the base and emitter electrodes of transistor 15 at the desired temperature.

When transistor 15 conducts, current will flow through base bias resistor 21 thereby causing a voltage drop between B+ terminal 22 and base 25 of transistor 26 which when of sufficient magnitude will cause transistor 26 to conduct. Capacitor 24 is inserted in parallel with resistor 21 to prevent spurious high frequency oscillations from occurring in the system.

Resistance 30 is a base bias resistor whose function with respect to transistor 31 is identical to the function of resistor 21 with respect to transistor 26. When transistor 31 conducts, current flows through resistor 45 into the base of transistor 35 thereby causing transistor 35 to conduct and dissipate the heat necessary to maintain the oven at a constant temperature. Resistor 45 limits the maximum current allowed to flow in transistor 35. In the illustrated embodiment, transistor 35 is a germanium transistor and must be capable of current cut-off at elevated temperature, a common problem with germanium transistors. Silicon diodes 42 and 43 are inserted to provide, in conjunction with resistor 40, a cut-off bias to transistor 35. None of elements 40, 42 and 43 are required where transistor 35 is silicon. But since in the embodiment illustrated the power transistor is a germanium transistor, and since there is a small amount of leakage current through the collector and base of a germanium transistor, such a transistor will be biased by the leakage current and conduct when not desired unless a voltage drop is provided to nullify the drop occasioned by the leakage current. In the present invention, leakage current bias is rendered by a voltage drop across silicon diodes 42 and 43 in the total amount of about one volt. This voltage drop thus prevents a high current from flowing through the emitter electrode of transistor 35 at a time when that transistor should be cut off.

In operation, it is important to emphasize first that the ambient temperature outside the oven must be below the temperature desired to be maintained in the oven since it is apparent that the temperature control circuit cannot lower temperature. Transistor 15 is selected, in conjunction with thermistor 12 and resistance 13, to begin to conduct when the temperature at which the oven is to be maintained is reached. The greater the temperature sensed by the thermistor, the lower is its resistance and the voltage drop across it. Thus, at temperatures above 50° C., in the present embodiment, the voltage drop across the thermistor, and across the base and emitter electrodes of transistor 15, is less than one-half volt and transistor 15 ceases to conduct. When transistor 15 is not conducting, succeeding transistors likewise are not and no heat is added to the oven. Conversely, at temperatures below 50° C., in the present embodiment, one-half volt or more is established between the base and emitter electrodes of transistor 15 causing that transistor to not only conduct but to conduct in inverse ratio to the temperature differential below 50° C.

When transistor 15 is biased so as to conduct, current flows through resistance 21 causing a voltage drop there-across and biasing the base and emitter electrodes of transistor 26. Diode 28 is inserted to limit the potential to the left of it to a predetermined value, in this embodiment 4 volts. When the current through resistance 21 reaches a value sufficient to produce a voltage drop which will cause transistor 26 to conduct, current will flow through that transistor and resistance 30 wherein a preselected value of current through resistance 30 will produce a voltage drop sufficient to cause transistor 31 to conduct. Diode 37 is inserted to limit the potential to the left of it to a predetermined value, in this embodiment 6 volts. Resistances 38 and 39 are current limiting resistors which are inserted to limit the current through diodes 37 and 28.

When transistor 31 conducts, the heater or power transistor 35 is biased between base and emitter and at a predetermined bias will conduct current of the order of one ampere in the illustrated embodiment. Such a current passing through transistor 35 produces sufficient heat to maintain temperature within $\frac{1}{10}$ degree centigrade of the desired temperature. During normal operation, after warmup, the heat output of the present invention adjusts itself to keep a steady temperature, in effect by the thermistor "telling" the heater what current to carry. The power transistor may be attached to the outer wall of the oven or other enclosure, as in the present embodiment, or may be supported within the enclosure without physical contact therewith. The heating provided by the present invention may be described as linear or proportional in contrast to the on-off type of control provided by prior temperature control devices. As stated earlier, the temperature sensed by thermistor 12 determines whether or not transistor 15 will conduct. There is no bimetallic strip or other mechanical on-off control associated with the thermistor, and thus there is no making or breaking of contacts with resultant noise, sparking, fatigue of metal or other similar undesirable features. The conduction or non-conduction of transistor 15 occurs at currents of the order of a few milliamperes, in the present embodiment, which, before amplification, have a negligible effect on measurable heat change in the enclosure or oven.

The combination of thermistor 12 and transistor 15 characteristics provides a unique common temperature cross-over point which serves as a reference standard and is used to regulate the device. So long as there is only one temperature at which the base-to-emitter conduction voltage on transistor 15 exactly equals the thermistor voltage, there can be compensating means such as a resistance inserted to change the parameters so as to adjust to a cross-over point at a temperature at which the enclosure is desired to be maintained. The point at which the temperature-voltage characteristics of the thermistor and transistor cross defines a unique single temperature in a usable range. Using transistor 15 as a reference standard permits maintaining the invention in compact form by requiring fewer components.

The proportionate or linear control of heat by the present invention permits a long life for the heating unit since all components except the thermistor may be made by solid state techniques, the thermistor being protected from excessive current by the action of resistance 13 and transistor 15. When the selected temperature is reached the power transistor will use power sufficient only to compensate for heat loss as the heat loss occurs. That is, there is no decrease in temperature to a substantially lower temperature than that desired in the oven or enclosure.

The components of the present device are small and light in weight as well as compact, and can withstand hard usage in a variety of environments including space vehicles. The present device may be used to control the temperature of high-voltage corona tubes where the sparking of on-off type devices cannot be tolerated. The device also eliminates undesirable and harmful radiation.

It will be understood that various changes in the details and arrangements of components and circuits, and in the operating temperature and heat production, which have been herein described and illustrated in order to explain the nature of the invention, may be made by those skilled in the art within the principle and scope of the invention as expressed in the appended claims.

What is claimed is:

1. A solid state network for controlling the temperature of an enclosure within less than one-tenth degree of a selected temperature comprising temperature sensing means and resistance means connected in series therewith, said temperature sensing means having a resistance value of $\frac{1}{2}$ the resistance value of said resistance means connected in series therewith, means connected in parallel with said temperature sensing means and said resistance means for varying current in response to the temperature sensed by said temperature sensing means, and amplifier means connected to said last mentioned means for amplifying said current, said amplifier means including at least one semiconductor of germanium material having its base and emitter electrodes biased to preclude conduction by leakage current after a selected cut-off temperature has been reached, said amplifier means providing linear replacement of heat losses from said enclosure.

2. The device claimed in claim 1 wherein said base and emitter electrodes are biased by at least one diode to prevent current from flowing through said emitter electrode at a time when said semiconductor should be cut off.

References Cited by the Examiner

UNITED STATES PATENTS

| | | | |
|---|---|---|---|
| 2,889,499 | 6/1959 | Rutz | 250—211 X |
| 2,932,714 | 5/1960 | Merrill | 219—20.41 |
| 2,938,130 | 5/1960 | Noll | 219—20.41 X |
| 2,972,684 | 2/1961 | Elliott et al. | 307—88.5 |
| 2,975,260 | 3/1961 | Carlson | 219—20.41 |
| 3,068,338 | 12/1962 | Bigler | 219—501 |
| 3,079,484 | 2/1963 | Schokley et al. | 219—501 |

RICHARD M. WOOD, *Primary Examiner.*

WALTER STOLWEIN, *Examiner.*

L. H. BENDER, *Assistant Examiner.*